United States Patent
Matsumoto

(10) Patent No.: US 6,455,985 B1
(45) Date of Patent: Sep. 24, 2002

(54) PRESSURE AND TEMPERATURE TRANSDUCER

(75) Inventor: Noriyuki Matsumoto, Yokohama (JP)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 09/856,257

(22) PCT Filed: Nov. 23, 1998

(86) PCT No.: PCT/IB98/01856
§ 371 (c)(1),
(2), (4) Date: May 16, 2001

(87) PCT Pub. No.: WO00/31509
PCT Pub. Date: Jun. 2, 2000

(51) Int. Cl.[7] ............................................. H01L 41/08
(52) U.S. Cl. ..................... 310/338; 310/367; 310/369; 310/371; 73/702; 73/703
(58) Field of Search ................. 310/335, 361, 310/367, 348, 369, 371; 73/702, 703

(56) References Cited

U.S. PATENT DOCUMENTS

| | | | |
|---|---|---|---|
| 3,617,780 A | 11/1971 | Benjaminson et al. | 310/8.2 |
| 4,228,532 A | * 10/1980 | Sims | 310/337 |
| 4,547,691 A | 10/1985 | Valdois et al. | 310/361 |
| 4,562,375 A | 12/1985 | Besson et al. | 310/338 |
| 4,754,646 A | 7/1988 | EerNisse et al. | 73/702 |
| 5,394,345 A | 2/1995 | Berard et al. | 364/571.03 |
| 5,471,882 A | 12/1995 | Wiggins | 73/702 |
| 6,147,437 A | 11/2000 | Matsumoto et al. | 310/338 |

FOREIGN PATENT DOCUMENTS

| WO | WO 00/14500 | 3/2000 | G01L/9/00 |
|---|---|---|---|

* cited by examiner

*Primary Examiner*—Thomas M. Dougherty
(74) *Attorney, Agent, or Firm*—Robin Nava; William B. Batzer; Brigitte L. Jeffery

(57) ABSTRACT

A pressure- and temperature-sensitive transducer comprises a tubular housing, a resonator located within the housing and end caps closing the ends of the housing. The resonator is located in a radial plane with respect to the housing and is connected to the housing by two separate connecting regions. The housing, resonator and connecting, regions are formed from a single piece of double rotation cut quartz. The shape, dimensions and position of the connecting regions is chosen to optimize stress in an axis responsive to changes in pressure and temperature while minimizing stress in an axis responsive predominantly to pressure.

23 Claims, 2 Drawing Sheets

PRESSURE AND TEMPERATURE TRANSDUCER

TECHNICAL FIELD

The present invention relates to a pressure and temperature transducer, and in particular to a piezoelectric, dual mode transducer suitable for use in a borehole environment.

BACKGROUND ART

Piezoelectric pressure and temperature transducers have been known for some time. Such transducers typically comprise a quartz crystal resonator located inside a housing structure. Electrodes are placed on opposite sides of the resonator to provide a vibration-exciting field in the resonator. Environmental pressure and temperature are transmitted to the resonator via the housing and the stresses in the resonator alter the vibrational characteristics of the resonator, this alteration being sensed and used to interpret the pressure and/or temperature. U.S. Pat. No. 3,617,780 (see FIG. 1) describes one form of such a transducer which comprises a unitary piezoelectric crystal resonator and housing structure 10 in which the resonator 12 is positioned on a median (radial) plane of the cylindrical housing 14. Crystal end caps 16, 18 are located at either end of the housing 14 to complete the structure of the transducer. Since the vibration of the resonator 12 is affected by both temperature and pressure, such devices can be difficult to use in environments where both vary in an uncontrolled manner. Such devices are known as single mode transducers.

One proposal to overcome this drawback of single mode transducers is described in U.S. Pat. No. 5,471,882. In this case and instrument is provided with two single mode transducers configured to have different temperature responses but similar pressure responses. By comparing the output of the two, the temperature effect can be cancelled. Another approach is to isolate one of the transducers from the environment to provide a reference against which the other can be calibrated.

U.S. Pat. Nos. 4,547,691 and 5,394,345 describe dual-mode transducers, an example of which is shown in FIG. 2. The resonators in such transducers have two vibrational modes at different frequencies, known as C mode and B mode. C mode is responsive to both pressure and temperature variation whereas the B mode is primarily responsive to temperature, the effect of pressure being relatively small. The structure of the dual-mode transducer again has a unitary resonator and housing structure 20. However, in this case, the resonator 25 lies in an axial plane of the cylindrical housing 22, the ends 26, 27 of the resonator 25 being unconnected to the housing 22. Again, electrodes are located on opposite faces of the resonator 25 to excite the vibrational behaviour.

U.S. Pat. No. 4,562,375 describes dual-mode and multiple-mode transducers, wherein the resonators in such transducers have at least two vibrational modes. U.S. Pat. No. 6,147,437 describes a transducer and tool for use in borehole environments with high temperatures and pressures.

Pressure and temperature transducers such as these find uses in borehole measurement tools such as are used in oil or gas wells. One example is the MDT Modular Formation Dynamics Tester of Schlumberger. One characteristic of oil and gas wells is that often relatively high temperatures and pressures are encountered. Also, the size of the tools is limited and it is important that the pressure and temperature measurement is relatively quick in order to allow fast measurements along the whole length of the well.

It is an object of the present invention to provide a transducer which can be made to withstand high temperatures and pressures and have a relatively small size and fast response time when applicable.

DISCLOSURE OF INVENTION

A transducer according to this invention comprises a central resonator section that is generally cylindrical in shape and has a resonator element located in a radial plane and end caps secured to the ends of the resonator section, the end caps having a base section with an outer wall extending around the periphery of the base section to define a cavity; and is characterised in that the end caps include an inner wall extending across the cavity within the outer wall.

Preferably the end cap base section has the same general shape (approximately circular) as the resonator section and the inner wall connects the outer wall across a diameter of the end cap. The inner wall can be of different dimensions to the outer wall. For example, the inner wall might be of lesser height and/or different thickness to the outer wall. The presence of the inner wall means that the end cap will be stiffer in one direction than another and so will transmit different stresses to the resonator according to the direction of the inner wall (an alternative view is that the support of the resonator section by the end caps against deformation is greater along the axis of the inner wall than orthogonal to this axis). Stresses along the axis of the inner wall will be poorly transmitted to the resonator whereas stresses orthogonal to this will be transmitted relatively easily.

The resonator is typically circular in shape and, as is common in the art, formed in a unitary fashion with the housing. However, the shape of the resonator can be chosen to suit requirements and may be formed separately from the housing. The end caps are likewise typically formed from a single piece of piezo-electric quartz crystal The position, size and shape of the internal wall is chosen so as to maximise stress contrast between orthogonal transverse axes of the end cap and hence maximise deformation in one direction and minimise deformation in the other direction on application of pressure to the transducer. The end caps in turn provide mechanical support to the resonator section so modifying its response to pressure accordingly. The resonator can be connected to the housing around all of its periphery or only in two regions to further emphasise the difference in response to applied pressure.

For a dual mode resonator, it is desirable that the sensitivity of the pressure/temperature sensitive mode (C mode) is aligned with the axis of maximum deformation and the temperature sensitive mode (B mode) is aligned with the axis of minimum deformation.

By adopting a transducer of the present invention, it is possible to produce a much smaller sensor which still retains accuracy, resolution and fast dynamic response when compared to the prior art designs.

It will be appreciated that changes can be made to the transducer while still remaining within the scope of the invention. The shape of the resonator can be selected according to requirements. A bi-convex shape is preferred for good energy trapping but planar or plano-convex section could also be used.

Many of the choices outlined above will depend upon the cut angles of the piezoelectric material of the resonator. The preferred material for the transducer of the invention is crystal quartz with a double rotation cut of angles □=24°, □=33° (WAD cut).

BEST MODE FOR CARRYING OUT THE INVENTION

Figure 1:
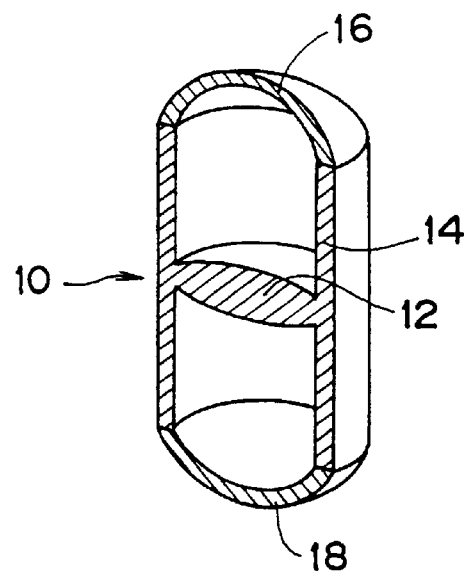
FIG. 1 shows a prior art transducer.
Figure 2:
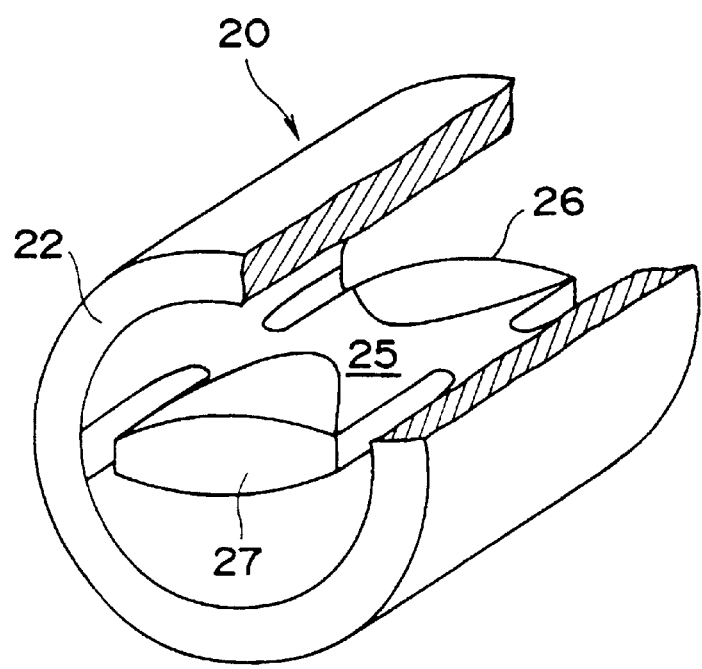
FIG. 2 shows a second prior art transducer.
Figure 3:
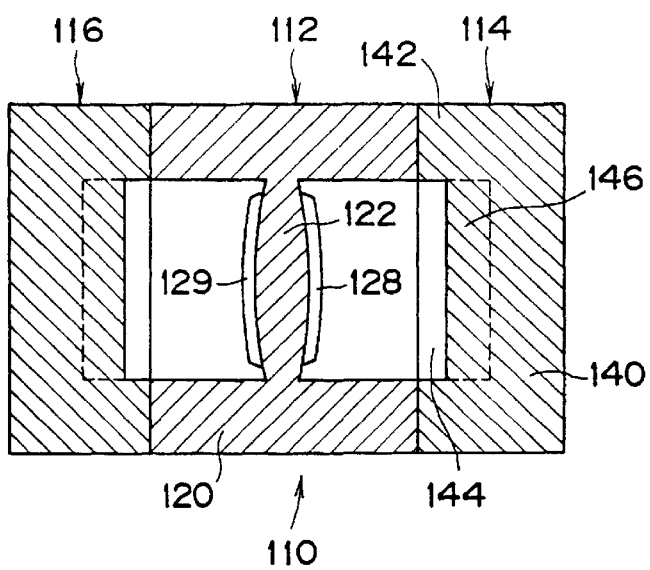
FIG. 3 shows a cross section of a transducer according to one aspect of the invention.

Referring now to the drawings, FIG. 3 shows a complete transducer 110 according to the invention. This comprises a central resonator section 112 with end cap sections 114, 116. The sections 112, 114, 116 are each formed as a unitary structure from a crystal quartz block using a double rotation cut. The process for forming piezoelectric transducers from such materials is well known in the art. Reference can be made to U.S. Pat. Nos. 4,547,691, 5,394,345, 3,617,780, 5,417,882 and PCT/IB98/101397 for further information and background in constructing such transducers.

The transducer 110 has a generally cylindrical shape (for example, a cylinder with an outer diameter of 10 mm) and the resonator section 112 comprises a disc with an outer wall section 120. The centre of the disc is shaped to form a resonator 122 of generally circular shape and bi-convex cross section. The resonator 122 is connected to the wall section 120 around its periphery. Electrodes 128, 129 are deposited on upper and lower surfaces of the resonator and extend to the exterior of the resonator section 112. The electrode material is typically gold although an intermediate layer of chromium can be used to inhibit migration of gold into the quartz material of the resonator. In FIG. 3, the resonator section is shown proportionately larger than would be normal for the purposes of clarity.

The end cap sections 114, 116 are symmetrical and have the same circular shape as the resonator section 112. The end caps 114, 116 are glued to the resonator section 112 by means of a liquid crystal glass frit with appropriate heat treatment so as to define a chamber within which the resonator 122 is located. This chamber is either subjected to high vacuum or filled with inert gas.

Figure 4:
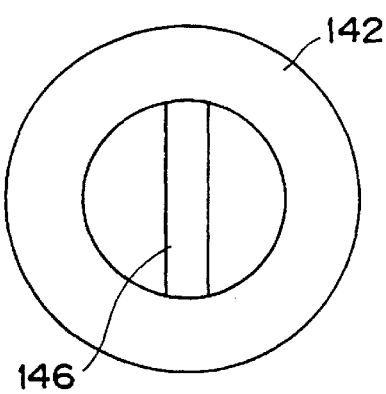
FIG. 4 shows a plan view of the end cap of FIG. 3.
Figure 5:
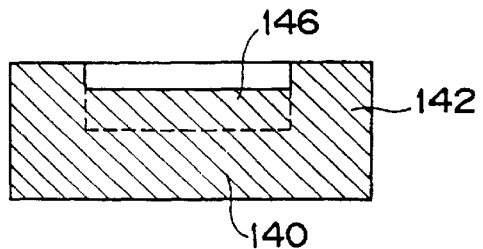
FIG. 5 shows a cross section on line YY of FIG. 4.
Figure 6:
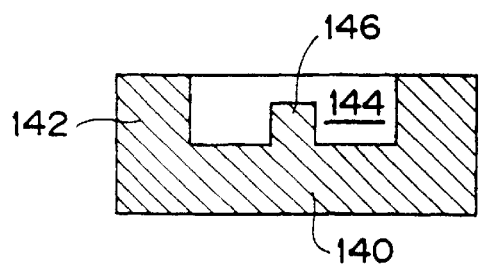
FIG. 6 shows a cross section on line XX of FIG. 4.

The end caps 114, 116 are shown in more detail in FIGS. 4, 5 and 6. They comprise a base section 140 of same outer shape as the resonator section 112 (for example, diameter 10 mm, thickness 2 mm), and an outer wall 142 extending from the base section 140 around its periphery (for example, height 4 mm, thickness 2 mm) so as to define a cavity 144. An inner wall 146 (for example, height 3 mm, thickness 2 mm) extends from the base section 140 across a diameter of the end cap within the cavity 144, the inner wall 146 connecting with the outer wall 142 at its ends. In the example shown here, the inner wall 146 has the same width as the outer wall 142 but is lower. In a typical transducer of the type discussed here, the inner wall 146 might be 1mm lower than the outer wall 142. It will be appreciated that the height and dimensions of the inner and outer walls can be varied to meet requirements. The heights of the outer and inner walls are also chosen to minimise the stress contrast across the joint with the resonator section 112. If the distortion of the end caps 114, 116 and resonator sections 112 are dramatically different at this point, the stress can cause the joint to crack in use.

In use, any stress on the outer wall 120 of the resonator section 112 due to environmental pressure will be transmitted to the resonator 122. The end caps 114, 116 are subject to the same environment and the outer walls 142 will influence the deformation of the resonator section 112. The presence of the inner wall 146 will mean that the end cap will be more resistant to deformation along the axis of the inner wall 146 and will support the resonator section 112 in this direction more than in the orthogonal, direction. This in turn will make the resonator 122 less sensitive to pressure variations in that direction. By ensuring that the axis of the inner wall 146 is aligned with the B mode vibration, the variation of this behaviour in response to pressure changes is minimise whereas the orthogonal C mode vibration is more readily affected. Thus the dual mode vibration characteristics of the resonator are emphasised. In the present case, WAD double rotation cut quartz is used having $\Phi=24°$, $\theta=33°$. It is possible that other cuts might also be appropriate, for example SC cut with $\Phi=21.93°$, $\theta=33.93°$, SBTC cut $\Phi=16.3°$, $\theta=34.5°$, X+30° cut with ($\Phi=30°$, $\theta=34°$, or any other cut which provides suitable vibration behaviour.

The drawings here show a simple disc-type resonator in the transducer. However, other forms might also be used. For example, the form of resonator described in PCT/IB98/01397 might be substituted in which case, the inner wall of the end caps will lie orthogonal to the axis of the connecting regions.

INDUSTRIAL APPLICABLITIY

The present invention finds application in pressure and temperature measuring devices, particularly in downhole tools for measuring temperature and pressure in oil and gas wells.

What is claimed is:

1. A pressure sensitive transducer comprising a central resonator section (112) that is generally cylindrical in shape and has a piezoelectric resonator element (122) located in a radial plane, and end caps (114, 116) secured to the ends of the resonator section, the end caps having a base section (140) with an outer wall (142) extending around the periphery of the base section to define a cavity (144); characterized in that the end caps include an inner wall (146) extending across the cavity within the outer wall, wherein the inner wall extends across a diameter of the end cap and connects to the outer wall.

2. A transducer as claimed in claim 1, wherein the resonator section and the end caps are approximately circular in cross section.

3. A transducer as claimed in claim 1, wherein the height of the inner wall and the outer wall of the end cap are different.

4. A transducer as claimed in claim 1, wherein the thickness of the inner wall and the outer wall are approximately the same.

5. A pressure sensitive transducer comprising a central resonator section (112) that is generally cylindrical in shape and has a piezoelectric resonator element (122) located in a radial plane, and end caps (114, 116) secured to the ends of the resonator section, the end caps having a base section (140) with an outer wall (142) extending around the periphery of the base section to define a cavity (144); characterized in that the end caps include an inner wall (146) extending across the cavity within the outer wall, wherein the inner wall extends across a diameter of the end cap and connects to the outer wall, wherein the resonator is a dual mode resonator.

6. A transducer as claimed in claim 5, wherein the resonator is formed from double rotation cut quartz.

7. A transducer as claimed in claim 6, wherein the end caps are formed from double rotation cut quartz.

8. A pressure sensitive transducer comprising a central resonator section (112) that is generally cylindrical in shape and has a piezoelectric resonator element (122) located in a radial plane, and end caps (114, 116) secured to the ends of the resonator section, the end caps having a base section (140) with an outer wall (142) extending around the periphery of the base section to define a cavity (144); characterized in that the end caps include an inner wall (146) extending across the cavity within the outer wall, wherein the inner wall extends across a diameter of the end cap and connects to the outer wall, wherein the inner wall of the end cap is aligned with the axis of the resonator mode that is sensitive predominantly to temperature.

9. A transducer as claimed in claim 5, wherein the resonator is bi-convex in shape.

10. A transducer as claimed in claim 2, wherein the height of the inner wall and the outer wall of the end cap are different.

11. A transducer as claimed in claim 2, wherein the thickness of the inner wall and the outer wall are approximately the same.

12. A transducer as claimed in claim 3, wherein the thickness of the inner wall and the outer wall are approximately the same.

13. A transducer as claimed in claim 5, wherein the resonator section and the end caps are approximately circular in cross section.

14. A transducer as claimed in claim 5, wherein the height of the inner wall and the outer wall of the end cap are different.

15. A transducer as claimed in claim 5, wherein the thickness of the inner wall and the outer wall are approximately the same.

16. A transducer as claimed in claim 5, wherein the height of the inner wall and the outer wall of the end cap are different and the thickness of the inner wall and the outer wall are approximately the same.

17. A transducer as claimed in claim 1, wherein the resonator is formed from double rotation cut quartz.

18. A transducer as claimed in claim 8, wherein the resonator is formed from double rotation cut quartz.

19. A transducer as claimed in claim 1, wherein the end caps are formed from double rotation cut quartz.

20. A transducer as claimed in claim 5, wherein the end caps are formed from double rotation cut quartz.

21. A transducer as claimed in claim 8, wherein the end caps are formed from double rotation cut quartz.

22. A transducer as claimed in claim 1, wherein the resonator is bi-convex in shape.

23. A transducer as claimed in claim 8, wherein the resonator is bi-convex in shape.

* * * * *